United States Patent
Stocker et al.

(10) Patent No.: US 6,186,261 B1
(45) Date of Patent: Feb. 13, 2001

(54) RESTRAINT SYSTEM ESPECIALLY FOR AN OCCUPANT OF A VEHICLE

(75) Inventors: Stefan Stocker, Yokohama (JP); Bernhard Mattes, Sachsenheim (DE); Gerhard Mehler, Besigheim (DE); Lothar Groesch, Stuttgart (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/381,152

(22) PCT Filed: Mar. 13, 1998

(86) PCT No.: PCT/DE98/00742
§ 371 Date: Sep. 14, 1999
§ 102(e) Date: Sep. 14, 1999

(87) PCT Pub. No.: WO98/52794
PCT Pub. Date: Nov. 26, 1998

(30) Foreign Application Priority Data

May 23, 1997 (DE) ................................. 197 21 636
Sep. 10, 1997 (DE) ................................. 197 39 655

(51) Int. Cl.$^7$ ............................. B60R 21/01; B60R 21/32
(52) U.S. Cl. ......................... 180/274; 280/735; 701/45; 342/72
(58) Field of Search ........................ 280/735; 180/271, 180/274, 282; 701/45; 342/72

(56) References Cited

U.S. PATENT DOCUMENTS

| | | | |
|---|---|---|---|
| 5,118,134 | * | 6/1992 | Mattes et al. ................. 280/735 |
| 5,398,185 | * | 3/1995 | Omura ......................... 280/735 |
| 5,626,359 | * | 5/1997 | Steffens, Jr. et al. .......... 280/735 |
| 5,787,377 | * | 7/1998 | Watanabe et al. .............. 280/735 |
| 6,052,634 | * | 4/2000 | Pathe et al. .................. 280/735 |

OTHER PUBLICATIONS

3rd International Symposium on Sophisticated Car Occupant Safety Systems, "Airbag 2000", Karlsruhe, Germany, Nov. 26–27, 1996, pp. 16–1 to 16–19 and 17–1 to 17–12.

* cited by examiner

*Primary Examiner*—Peter C. English
(74) *Attorney, Agent, or Firm*—Michael J. Striker

(57) ABSTRACT

A restraint system is disclosed which with high reliability trips one or more restraint devices, if in a collision there is the risk of injury to vehicle occupants. This restraint system is equipped with at least one seat position senor (SPS1, SPS2, . . . , SPSm), with which a change in the seat position of at least one vehicle occupant can be ascertained, and a control unit (SE) forms a first criterion for tripping one or more restraint devices (R1, R2, . . . , Rk) if the rate of change of the seat position exceeds a predeterminable threshold. The control unit (SE) forms a second criterion for tripping one or more restraint devices (R1, R2, . . . , Rk) if one or more precrash sensors (PCS1, PCS2, . . . , PCSn) signal an incipient collision. The control unit (SE) does not cause the tripping of one or more restraint devices (R1, R2, . . . , Rk) unless both tripping criteria are satisfied and also a braking datum (BI), advantageously generated by a brake light switch, is present.

9 Claims, 1 Drawing Sheet

RESTRAINT SYSTEM ESPECIALLY FOR AN OCCUPANT OF A VEHICLE

BACKGROUND OF THE INVENTION

1. Field of the Invention

The present invention relates to a holding-back system, or restraint system, which has one or more restraint devices for vehicle occupant and is equipped with at least one seat position, with which a change in the seat position of at least one vehicle occupant can be ascertained, wherein a control unit forms a first criterion for tripping one or more restraint devices if the rate of change of the seat position exceeds a predeterminable threshold.

2. Prior Art

One such restraint system is known from German Patent Disclosure DE 40 05 598 A1. In this known restraint system, in addition to a first tripping criterion, which is derived from a certain change in seat position of a vehicle occupant, a second tripping criterion is obtained, which depends on whether the vehicle acceleration, measured by an acceleration sensor, exceeds a predetermined limit value. Thus if an actual tripping of one or more restraint devices (such as an airbag or belt tightener) is to occur, two tripping criteria must be simultaneously met. This increases the operational safety of a restraint system, because the two tripping criteria together make it possible to make a more reliable decision about a vehicle collision that requires the restraint devices to be tripped.

SUMMARY OF THE INVENTION

It is an object of the present invention to provide an improved restraint system, especially an improved restraint system for an occupant of a vehicle.

According to the invention, along with a first tripping criterion, which depends on the change in the seat position of at least one vehicle occupant, a second criterion for tripping one or more restraint devices is formed that is furnished by one or more precrash sensors. Accordingly if one or more precrash sensors detect an incipient collision and if furthermore a seat position sensor detects a rapid change in the seat position of a vehicle occupant (caused for instance by a braking maneuver), then one or more restraint devices can be tripped correspondingly earlier. The system of the invention makes do without acceleration sensors. Since acceleration sensors do not output a signal dependent on the vehicle acceleration or deceleration until the collision is already occurring, there is only a very brief reaction time available for tripping restraint devices. The reaction time for tripping restraint devices is considerably longer if recourse can be had to signals of precrash sensors, which make an early detection of whether a crash is about to occur. To guarantee that a change in seat position of a vehicle occupant can in fact be a scribed to a braking event, that is highly likely to be associated with an incipient crash, tripping of restraint devices is not done until, in addition to the tripping criteria, a braking datum is present. The braking datum may be furnished by a brake light switch.

Advantageous further features of the invention are defined by the dependent claims.

According to these dependent claims, the seat position and also the precrash sensor can be embodied either by optical sensors or ultrasonic sensors or microwave sensors. The control unit, which evaluates the precrash and seat positions, is advantageously accommodated together with the seat position sensor or seat position sensors in the same housing.

BRIEF DESCRIPTION OF THE DRAWINGS

With the aid of an exemplary embodiment shown in the drawing, the invention will be described in further detail below, in connection with the appended figures, in which.

DESCRIPTION OF THE PREFERRED EMBODIMENT

Figure 1:
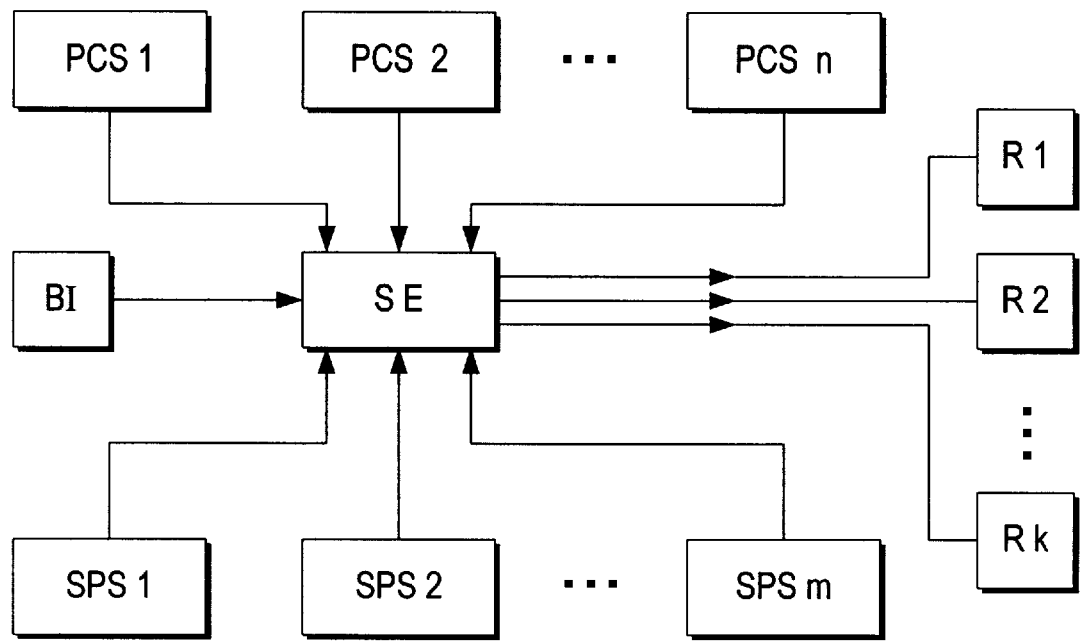
FIG. 1 is a block circuit diagram for the restraint system according to the invention.

As can be seen from FIG. 1, a restraint system has a control unit SE. This control unit SE is supplied on the one hand with the output signals of one or more precrash sensors PCS1, PCS2, . . . , PCSn and on the other with the output signals of one or more seat position sensors SPS1, SPS2, . . . , SPSm. As will also be explained in conjunction with FIG. 2, from the output signals of all these sensors, the control unit SE derives criteria for the tripping of one or more restraint devices (such as an airbag or belt tightener) R1, R2, . . . , Rk.

Intelligent restraint systems as a rule employ precrash sensors, of the kind described for instance in the Proceedings of the 3rd International Symposium on sophisticated car occupant safety systems, "Airbag 2000", Karlsruhe, Germany, Nov. 26th and 27th, 1996, pages 16-1 through 16-19 and 17-1 through 17-12. There are essentially three functional principles for precrash sensors. Either they comprise optical sensors, or ultrasonic sensors, or microwave sensors. These sensors, disposed either on the front or along sides of the vehicle, observe the near region around the vehicle and detect whether the distance between the vehicle and obstacles in the surroundings of the vehicle decreases in such a way that the threat of a collision exists.

From the aforementioned Proceedings and also from DE 40 05 598 A1, seat position sensors are known that are capable of determining changes in position of vehicle occupants. For this seat position detection as well, once again three different types of sensors can be used, namely optical sensors (such as infrared sensors) or ultrasonic sensors or microwave sensors. With these sensors, not only can a change in position of a vehicle occupant be ascertained, but the rate at which the seat position changes can also be determined. With such seat position sensors, one or even more seats in a vehicle can be observed, and seat position changes of one or more vehicle occupants can be recorded. By monitoring the seat position of a plurality of vehicle occupants, it is possible to draw a conclusion about the motion of the vehicle, and from this it can be learned which of the existing restraint devices should be tripped in order to protect the occupants.

Figure 2:
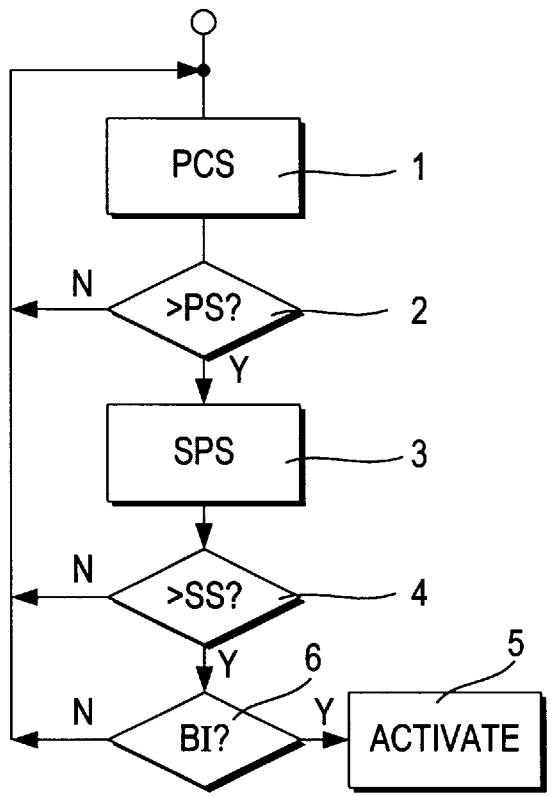
FIG. 2 is a flowchart, in accordance with which a control unit processes the sensor signals.

FIG. 2 shows a flow chart according to which the control unit SE, from the individual sensor signals, derives criteria for tripping restraint devices. In the first step 1, the output signals of the precrash sensors PCS1, PCS2, . . . , PCSn are first detected. To represent all the output signals of the precrash sensors, one output signal PCS will be named. This may be either the output signal of a single precrash sensor or the combination of the output signals of a plurality of precrash sensors. In a step 2, a threshold value decision is made, and specifically the question is asked whether the precrash sensor signal PCS is greater than a predetermined threshold PS. If not, then a new precrash sensor signal PCS is detected. However, if the precrash sensor signal PCS does exceed the predetermined threshold PS this threshold PS stands for a high likelihood that a collision will occur—then in the next method step 3, the output signal SPS of one or more seat position sensors is detected. Expediently, the seat position signal SPS indicates the rate at which the seat position of a vehicle occupant has changed. In an ensuing threshold value decision step 4, the seat position signal SPS is compared with a predeterminable signal SS. This threshold SS is a rate value for the change in seat position of a vehicle occupant in which the likelihood is high that one of the vehicle occupants would be injured if one or more restraint devices were not tripped. Accordingly if the threshold SS of the seat position signal SPS is exceeded, then in step 6 one or more restraint devices may be tripped. Accordingly two criteria are required to trip restraint devices. The first criterion depends on the precrash sensor signal PCS, and the second criterion depends on the seat position signal SPS.

In step 5 of the method sequence in FIG. 2, it is asked whether simultaneously with the two other tripping criteria, a braking datum BI is also present. The braking datum BI supplied to the control unit SE can be furnished most simply by a brake light switch. That is, if in addition a braking datum is taken into account in the tripping decision, then one can be sure that a change in seat position of a vehicle occupant can be ascribed to a braking event, which in most cases precedes an incipient crash. This precludes a change in seat position that is made by the occupant himself from forming a tripping criterion.

It saves a great deal of space and weight if the seat position sensor or seat position sensors SPS1, SPS2, . . . , SPSm and the control unit SE are accommodated in a common housing, which can be installed in the vehicle roof, for instance.

What is claimed is:

1. A restraint system for occupants of a vehicle, said restraint system comprising at least one restraint device (R1, R2, . . . , Rk) for holding-back or restraining at least one occupant of said vehicle;

at least one seat position sensor (SPS1, SPS2, . . . , SPSm), said at least one seat position sensor including means for determining a change in a seat position of said at least one occupant of said vehicle;

at least one precrash sensor (PCS1, PCS2, . . . , PCSn) for generating at least one precrash signal indicative of an incipient collision; and a control unit (SE) including means for forming a first criterion for tripping said at least one restraint device if a rate of change of said seat position of said at least one occupant exceeds a predetermined threshold;

means for forming a second criterion for tripping said at least one restraint device if said at least one precrash sensor generates a precrash sensor signal indicative of said incipient collision; and means for tripping said at least one restraint device if and only if both of said tripping criteria are simultaneously satisfied and a braking datum is present.

2. The restraint system as defined in claim 1, wherein the braking datum is generated in response to a brake light switch signal from a brake light switch provided in said vehicle.

3. The restraint system as defined in claim 1, wherein said at least one seat position sensor is an optical sensor.

4. The restraint system as defined in claim 1, wherein said at least one seat position sensor is an ultrasonic sensor.

5. The restraint system as defined in claim 1, wherein said at least one seat position sensor is a microwave sensor.

6. The restraint system as defined in claim 1, wherein said at least one precrash sensor is an optical sensor.

7. The restraint system as defined in claim 1, wherein said at least one precrash sensor is an ultrasonic sensor.

8. The restraint system as defined in claim 1, wherein said at least one precrash sensor is a microwave sensor.

9. The restraint system as defined in claim 1, further comprising a common housing accommodating both said control unit (SE) and said at least one seat position sensor (SPS1, SPS2, . . . , SPSm).

* * * * *